United States Patent [19]
Rüttimann

[11] Patent Number: 5,366,286
[45] Date of Patent: Nov. 22, 1994

[54] WAND-TYPE HAND MIXER HAVING A REMOVABLE MIXING HEAD

[75] Inventor: Max Rüttimann, Märstetten, Switzerland

[73] Assignee: Maweva Holding AG (Ltd.), Rickenbach b. Wil, Switzerland

[21] Appl. No.: 168,651

[22] Filed: Dec. 16, 1993

[30] Foreign Application Priority Data

Jan. 19, 1993 [DE] Germany ............... 4301209

[51] Int. Cl.⁵ .................................. B01F 13/04
[52] U.S. Cl. .................................. 366/129; 366/331; 403/13; 416/244 R
[58] Field of Search ............... 366/129, 197, 331, 342, 366/343; 416/244 R; 403/13, 14, 349; 464/179

[56] References Cited

U.S. PATENT DOCUMENTS

| | | | |
|---|---|---|---|
| 4,405,998 | 9/1983 | Brison | 366/343 X |
| 4,832,573 | 5/1989 | Dorski | 416/244 R |
| 4,850,699 | 7/1989 | Rebordosa | 366/129 |

FOREIGN PATENT DOCUMENTS

| | | |
|---|---|---|
| 1117914 | 5/1956 | France . |
| 2470576 | 6/1981 | France . |
| 1765924 | 2/1958 | Germany . |
| 1119476 | 12/1961 | Germany . |
| 1174949 | 7/1964 | Germany . |
| 1182399 | 11/1964 | Germany . |
| 1242817 | 6/1967 | Germany ............... 366/331 |

Primary Examiner—David A. Scherbel
Assistant Examiner—Charles Cooley
Attorney, Agent, or Firm—Frishauf, Holtz, Goodman & Woodward

[57] ABSTRACT

A shaft (6) extending from a motor housing (1) of the mixer terminates in an end portion (10) which, for easy attachment of a mixing head (H) thereto, is formed with a shallow circumferential groove (18). This permits fitting a hub or sleeve (13) on the mixing head (H) onto the end portion (10) of the shaft with axial misalignment, without exerting lateral bending forces on the hub (13). The head is formed with a resiliently deflectable tab or flap (15) for frictional engagement with the shaft, to hold the head in secure axial position on the shaft. The terminal end (19) of the shaft (6) is convex and rounded, or essentially part ball-shaped or part-spherical. Preferably, a guide ring or guide surface (23), having the diameter of the shaft, is positioned between the circumferential or ring-shaped groove (18) and the convex and rounded, or part spherical ball-shaped or part end (19). The groove (18) is shallow, wider than deep, and preferably, in cross section, part-circular. The circle has a radius of curvature of preferably between about 75% to 150% of the diameter of the shaft (6) on which the mixing head is fitted.

16 Claims, 3 Drawing Sheets

WAND-TYPE HAND MIXER HAVING A REMOVABLE MIXING HEAD

FIELD OF THE INVENTION

The present invention relates to a kitchen appliance, and more particularly to a hand mixer of the wand type, that is, a hand mixer having a motor in a housing adapted to be gripped by the user. A shaft extends from the housing, in line or coaxial with the shaft of the motor. A mixing head having a tubular coupling extension can be attached to the motor shaft, for immersion in materials to be treated upon rapid rotation of the mixing head.

BACKGROUND

Mixers of this type are used for folding, stirring, mixing, combining, blending, whipping, emulsifying, homogenizing and beating of substances retained in a bowl. Mixers of this kind, if they have one shaft, are also referred to as wand-type mixers; others have two parallel shafts. These mixers, and particularly the wand-type mixers, are supplied with mixing heads of different shapes which, respectively, can be attached to the shaft to carry out the desired operation; for example, operating heads intended for stirring of quite viscous substances, or combining of substances with each other, will have different shapes from those intended to cream substances, for example potatoes, or to beat eggwhites, or to whip cream. Other mixing heads may be used to chop substances, for example nuts, dried fruit and the like. These removable mixing heads usually have a metal sleeve forming a hub, adapted to be fitted over the operating shaft. A groove or notch may be provided in the hub sleeve, which is engaged by a carrier pin formed on the shaft, to transmit torque and rotary motion. The operating head, in operation of the appliance, of course should be securely seated on the end of the shaft and must not inadvertently become loose or detached from the shaft. To assure such positive engagement, the hub is frequently provided with an elastically deformable region, for example defined by a pair of axially extending slits. This region is slightly deflected outwardly when the hub is engaged with the shaft, in order to provide resilient engagement force for frictional engagement of the remainder of the sleeve with the shaft. The resilient region, thus, in effect forms a springy tab or flap, separated from the remainder of the hub by the two longitudinal slits or cuts.

The hub is usually chamfered around the outer edge in order to facilitate attachment of the hub on the shaft.

It has been found in use that this arrangement, which is simple and effective and entirely adequate for most operating conditions, yet requires careful attention upon joining the operating head to the shaft. If the user tries to engage the operating head while the hub is at an inclination with respect to the axis of the shaft, and then forces the operating head on the shaft, the springy tab will be bent outwardly. This bend may remain set, by plastic deformation. As a consequence, secure frictional engagement of the attached operating head on the operating shaft is no longer ensured. The operating head, thus, may inadvertently become detached from the shaft. If the springy engagement tab is deformed, it is possible to return it to its initial position, for example by bending it backwards with pliers in order to again provide for springy engagement of the hub with the shaft, and so that the springy tab can again function as a force-applying element. Re-bending the tab, however, requires some dexterity and mechanical ability on part of the user, which cannot always be expected. Repeated bending of the tab, also, weakens the joint between the tab and the remainder of the hub, which may lead to failure of the operating head, and permanent loss of springiness of the tab.

THE INVENTION

It is an object to provide a kitchen appliance, and more particularly a hand mixer, having a projecting shaft in which the operating tool is so formed that it can be easily and simply fitted on the shaft without danger of unintended interference with the frictional engagement of the head with the shaft.

Briefly, the hand mixer is formed with a fast attachment and removal arrangement for the operating head to permit, upon attachment of the operating head, some misalignment with the shaft of the mixer without damage to the operating head, in which an convex and rounded, or essentially part-spherical or part ball-shaped section is formed on the terminating end of the end portion of the shaft which, as customary, is at least in part cylindrical. A shallow circumferential ring groove, which is wider than deep, is formed between the convex and rounded, essentially part spherical end section and an adjacent cylindrical section on the end portion of the shaft.

The location of the ring groove, with respect to the hub on the operating head, is so selected that when the operating head is engaged with the shaft, the ring groove is located within the hub.

Wand-type hand mixers frequently operate at very high speeds; the shaft may rotate at up to about 20,000 revolutions per minute (rpm). Such high speeds require precise centering of the operating head on the shaft. If not accurately centered, the mixer will be noisy and unbalanced. The unbalance leads to stresses on the bearings of the shaft which, if extended, will damage the hand mixer. To ensure centered positioning of the operating head on the shaft, and in accordance with a preferred feature of the invention, a guide region or guide portion of shaft diameter is located between the circumferential groove and the essentially spherical or part-spherical or ball-shaped termination of the shaft. This guide portion or guide region can be formed by a circumferential edge or a ridge, having the diameter of the shaft; in accordance with a preferred feature, however, the guide portion is a smooth cylindrical narrow section, having an axial length of at least 0.2 mm. Customary diameters of the shaft are about 6 mm; with such shafts, guide portions slightly longer than 0.2 mm prevent reduction of the diameter of the shaft end and the guide portion upon repeated fitting of operating heads and removal of operating heads from the shaft. If the diameter of the guide portion becomes reduced, its guiding functions are impaired. The guide region or guide portion ensures that the hub is reliably radially guided at both sides of the circumferential groove or recess, when attached to the end portion of the shaft.

In accordance with a preferred feature of the invention, the ball-shaped terminal end of the shaft is formed part-spherical. The circumferential ring groove should have a cross-sectional profile or shape which, starting from a minimum shaft diameter, that is, from maximum depth of the groove, defines a gradually outwardly expanding surface, which forms a positioning guide surface upon engagement of the operating head with the shaft, engageable by an inner edge of the hub, particularly when the hub is not placed on the shaft in centered alignment. The profile of the groove, in longitudinal section, preferably has an essentially circular curvature, having a center of curvature located outside of the diameter of the operating shaft. The radius of the spherical or part-spherical end portion, preferably, is smaller than that of the radius of the circle defining the ring-shaped groove. These relationships effectively prevent excess stress on the resilient or flexible tab on the hub when the operating head is attached on the shaft, that is, that radial forces might arise which press the resilient tab outwardly with the above-described undesirable results. Preferably, the axial length of the spherical ball end is less than the axial length of the ring-shaped groove.

The attachment arrangement, as described, has the advantage that the hub will be self-centered upon engagement of the operating head with the shaft. Less care and attention on part of the user is required when fitting the operating head on the shaft. Even if the operating head is initially placed against the shaft at an inclination with respect to the shaft axis, the hub will slip automatically into axial alignment without overstressing the flexible frictional engagement tab on the hub. This is particularly important for home appliances where the operating head needs to be removed frequently for cleaning or replacement with heads intended for different functions.

DRAWINGS

Figure 4:
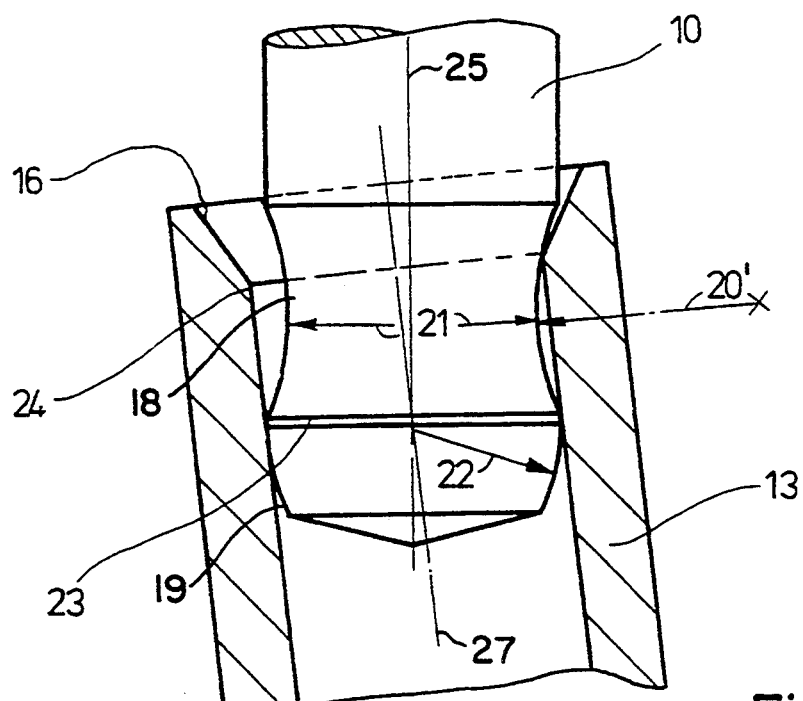
Figure 5:
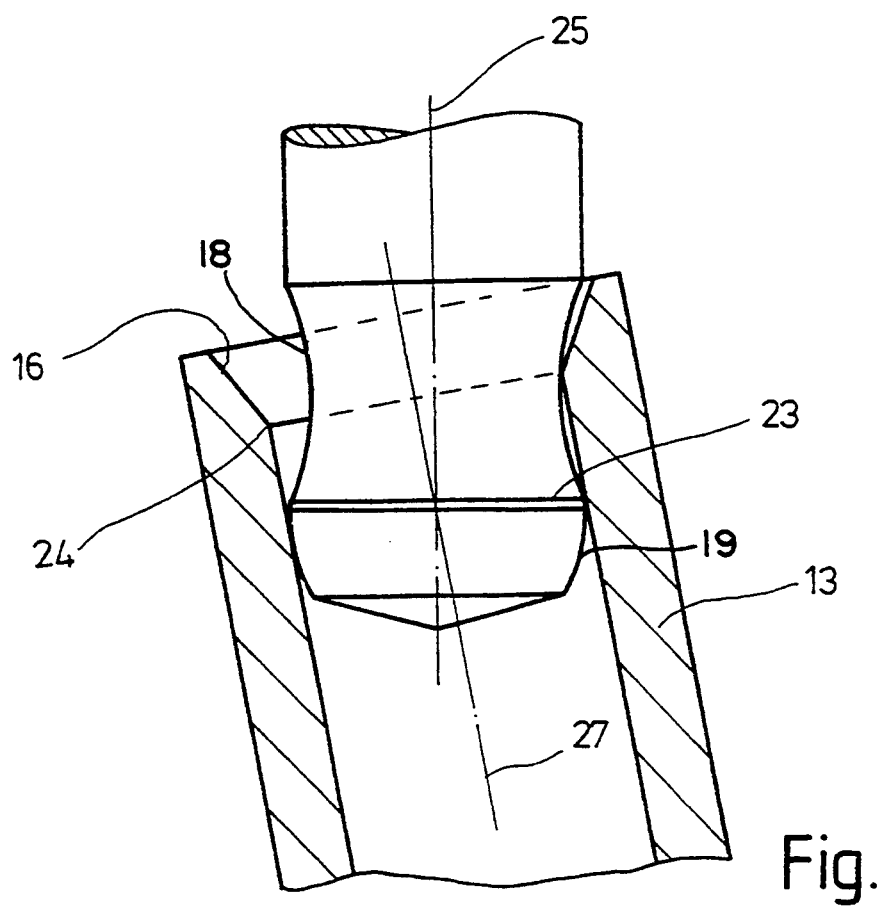

FIG. 4 shows the hub end of the operating head upon initial, misaligned engagement with the end portion of the shaft, to a still more enlarged scale; and FIG. 5 is a view similar to FIG. 4, and illustrating another misaligned positioning of the hub of the operating head with respect to the end portion of the shaft, and the centering effect of the arrangement in accordance with the present invention.

DETAILED DESCRIPTION

Figure 1:
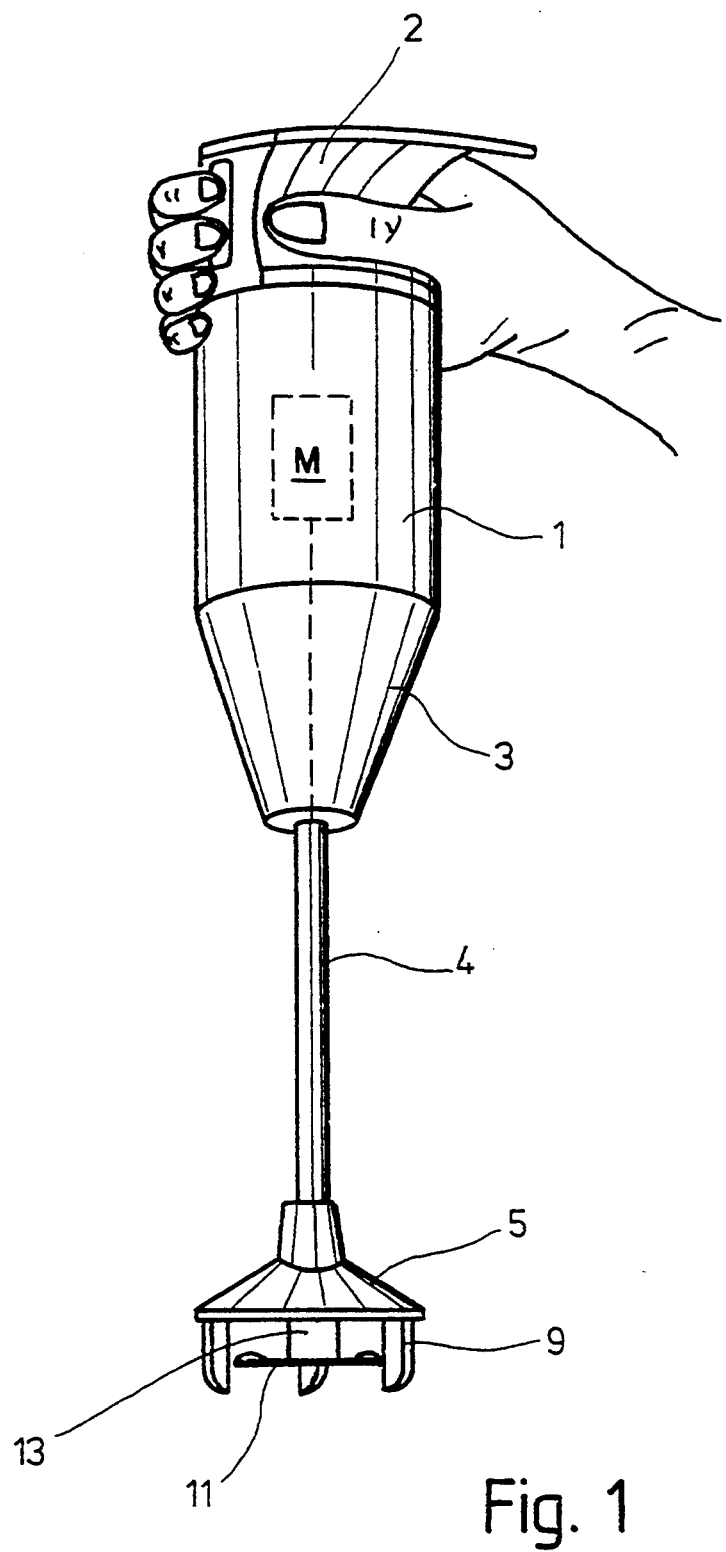
FIG. 1 is a side view of a wand-type food mixer in accordance with the present invention.
Figure 2:
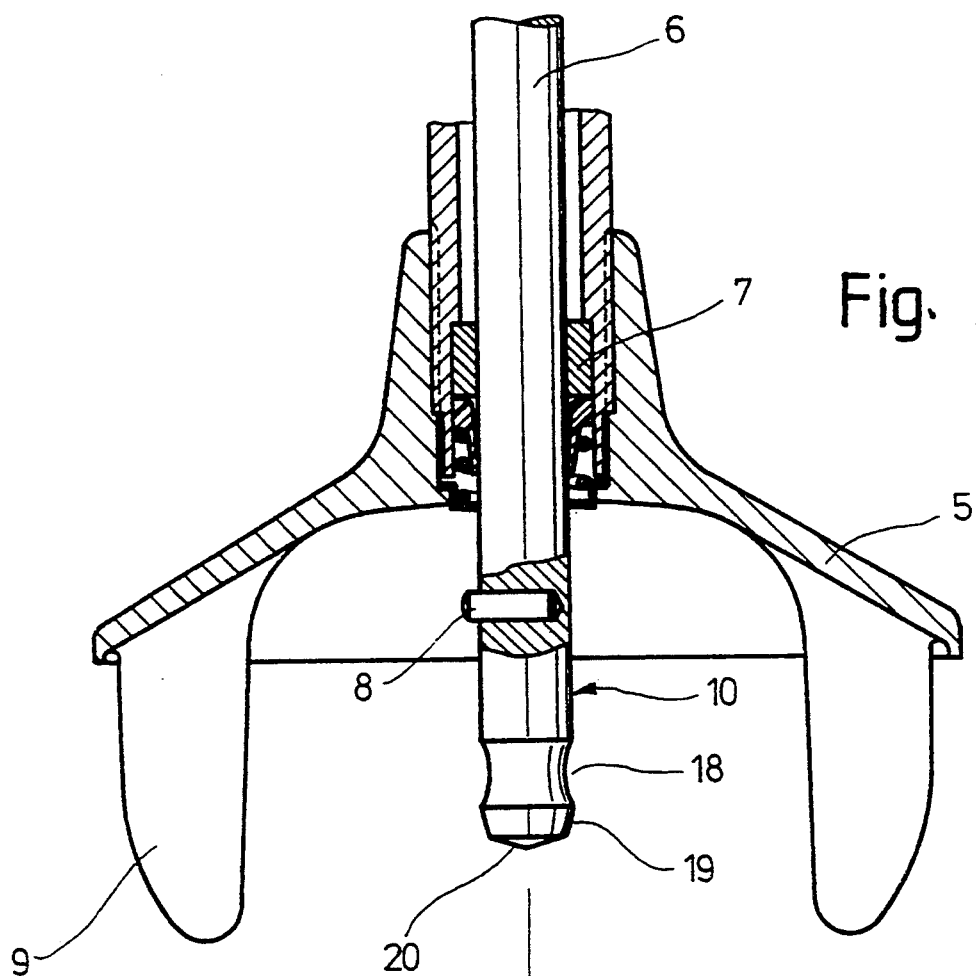
FIG. 2 is a part-sectional view of the end portion of the mixer in the region of the free end of the shaft, to an enlarged scale.

The wand-type hand mixer illustrated in FIG. 1 has an essentially cylindrical housing 1 formed with a hand holding portion 2 at the top and one side thereof. The apparatus is so shaped that it can be grasped by one hand, as illustrated in FIG. 1. The lower portion of the housing terminates in a conical section 3 to which a protective tube or sleeve 4 is attached, terminating in a protective cover shroud 5 having legs 9, which are shaped as wings to promote mixing of substances. The shaft 6, usually, has a diameter of about 6 mm. An electric motor M shown only schematically, is located within the housing 1 and coupled to the shaft by a suitable gearing. The shaft 6, see FIG. 2, is journalled at its lower end in a bearing 7. A carrier pin 8 is fitted into the shaft, located within the bell-shaped shroud 5, as clearly seen in FIG. 2. The legs 9 are wing-shaped; preferably, four legs are provided, radially spaced from the shaft 6, and so shaped that the flow conditions of substances located in the region of the bottom end of the shaft 6, when an operating head H is attached thereto, will be influenced thereby; additionally, they provide protection for the operating head.

Figure 3:
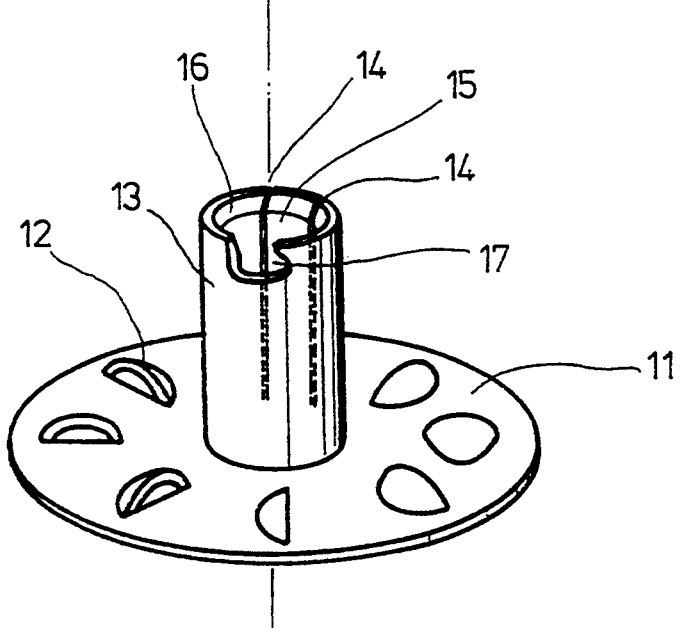
FIG. 3 is a perspective view of operating head adapted to be fitted on the end portion of the mixer, shown in FIG. 2.

FIG. 3 is a perspective view of one type of operating head used, for example, for beating or whipping. The head H is formed as a circular disk 11, with part-spherical projections 12 extending therefrom. A coaxial hub 13 projects at right angle from the disk 11. The hub 13 is preferably made of steel, that is, a springy elastic i.e., resilient material, and forms an attachment sleeve. Two parallel axially extending slits 14 are formed in the hub which define a spring flap or tab 15, which is biassed slightly inwardly, and when fitted on the end portion 10 of the shaft 6 ensures frictional engagement of the operating head H with the shaft 6. The edge of the sleeve or hub 13 is formed with a chamfer 16, in conical form (see also FIGS. 4 and 5). The hub 13 is formed with an open notch 17, for engagement with pin 8 on the shaft end 10 of the shaft 6, and to ensure a rotation transmitting engagement between the shaft and the operating head.

In accordance with a feature of the invention, the shaft end 10 is formed with a circumferentially extending or ring-shaped depression or groove 18. The groove 18 is formed at the end portion 10 of the shaft, outwardly, with respect to the motor within the housing 1, of the pin 8. The terminal end or tip of the end portion 10 of shaft 6 is formed by a convex and rounded, part ball-shaped or part-spherical portion 19, which extends up to the tip end face 20 of the end portion 10 of the shaft 6 as best seen in FIGS. 2, 4 and 5.

The surface of groove 18 is smooth, see FIGS. 4 and 5. The groove is shallow, and wider than deep.

The groove 18 in cross section is given a particular profile or shape. In longitudinal section, it is essentially circularly curved, with a radius of curvature 20' (FIG. 4). The diameter of the groove, at its deepest point, is shown at 21, located approximately axially in the middle of the lateral ends of the groove 18.

The ball-shaped end 19 of the shaft 6 is formed, essentially, as a portion of a sphere. The radius 22 of the sphere is smaller than the radius of curvature 20' of the groove 18. In a shaft of about 6 mm diameter, the radius of curvature 22 is about 4 mm. The radius 20' of the groove 18 is about 5.1 mm. FIGS. 4 and 5 best illustrate that the axial length of the ball-shaped portion 19 is substantially less than the axial length of the groove 18 and, preferably, about one-quarter of the axial length of groove 18.

In accordance with a feature of the invention, a smooth-walled cylindrical guide region 23 is located between the groove 18 and the ball-shaped end portion. The diameter of the guide region or guide ring 23 is equal to the diameter of the shaft 6 in the region of the end 10 of the shaft. Its axial length is small in comparison to the axial length of the groove 18 and, for a shaft of about 6 mm diameter, is 0.2 mm or slightly more. Thus, the axial length of the guide ring 23 is less than the axial length of the ball-shaped end portion 19 as is clearly apparent from FIGS. 4 and 5.

Operation, and Assembly of a Selected Operating Head H

Attempting to fit an operating head H on the shaft 10 such that the axis 27 of the hub 13 is at an inclination with respect to the axis 25 of the shaft 6, is best seen in FIG. 5. The chamfered end 16 of the hub 13 initially engages the concave circumferential surface of the groove 18 in a region above the minimum diameter 21 of the groove 18. Due to the ball-shaped end portion 19, this inclined engagement is permitted. This engagement is possible without applying any spreading force against the inner wall of the hub 13; hence no spreading force on the spring tab or flap 15 (FIG. 3) will be applied.

Upon further axial engagement, the edge 24 at the lower end of the chamfer 16 slides on the circumferential surface of the groove 18 which, in this region, has a diameter larger than the diameter 21 (see FIG. 4), thus automatically aligning the hub 13 with its hub axis 27 with the axis 25 of the shaft 6, and its end portion 10.

The foregoing effect is easily seen when comparing FIGS. 5 and 4, in which FIG. 4 illustrates the position in which the hub is engaged on the shaft by an axially increased distance.

When the edge 24 finally reaches the end of the groove 18 closest to the motor, hub 13 is in exact alignment with the axis of the shaft 6 and its end portion 10. As the hub is further pushed on the end of the shaft, the cylindrical inner wall of the hub 13 will fit exactly, coaxially, on the end portion 10 of the shaft 6. The attachment process is terminated as soon as the engagement pin 8 (FIG. 1) engages in the notch 17, thereby providing rotation-transmitting coupling between the shaft and the hub and secure axial seating. When the end portion 10 of the shaft is so seated in the head H, the groove 18 is located within the hub 13. The hub 13 is guided on both sides of the groove 18, on the upper end by the shaft end 10 itself, and on the lower end, that is, beyond the groove 18, by the guide region or guide ring 23. These surfaces provide for precise axial alignment and radial guidance. The axial position of the hub 13 is ensured by the radial bias of the spring flap or tab 15 against the end portion 10 of the shaft 6 and the resultant frictional engagement.

The invention has been described with reference to a wand-type mixer, but is equally applicable to other types of mixers.

Various changes and modifications may be made, and any features described herein may be used with any of the others, within the scope of the inventive concept.

The radius of curvature 20' of the groove 18, preferably, is between about 75% to 150% of the diameter of the shaft 6. The depth of the groove, measured at the minimum diameter 21, preferably is between about 4% to 8% of the shaft diameter.

I claim:

1. Hand mixer, for combination with a selectively removable mixing head (H);
   said hand mixer having:
   a housing (1) having a shaft guiding portion (4);
   a mixing head (H);
   a motor-driven shaft (6) located within the shaft guiding portion, and defining an axis (25);
   said shaft having an end portion (10) which is at least in part, cylindrical, and is adapted to selectively removably receive said mixing head (H), and including rotation transmitting coupling means (8) between the shaft and the mixing head;
   said mixing head (H) having an essentially cylindrical hub (13);
   said hub (13) being adapted to be selectively removably fitted on said end portion of the shaft, and engageable with said rotation-transmitting coupling means;
   and resilient means (14, 15) coupling said hub to said shaft for mutual frictional engagement of said hub (13) on said shaft end portion (10);
   and wherein, in accordance with the invention;
   said hand mixer is formed with a fast attachment arrangement for the mixing head (H) while permitting unintended misalignment of the mixing head with the end portion of the shaft during attachment;
   said attachment arrangement comprising:
   a convex and rounded, or essentially part ball-shaped section (19) terminating the end portion (10) of said shaft (6);
   a shallow, circumferential ring groove (18), having an axial length which is greater than its depth formed between the convex and rounded, or the essentially part ball-shaped end portion (19) and a cylindrical part of the end portion (10) of the shaft (6); and wherein:
   the hub (13) of the mixing head (H) has an open end including an inner edge (24) defining a guide surface;
   the circumferential ring groove (18), in axial cross section, has a minimum diameter (21) which is less than the diameter of the end portion (10) of said shaft (6); and
   wherein the circumferential ring groove (18) is shaped to define guide surfaces which gradually smoothly increase towards the diameter of said end portion (10), said guide surfaces forming a groove guide surface for said edge (24) formed on the hub (13).

2. The hand mixer of claim 1, including an essentially cylindrical guide ring (23) formed on the end portion (10) of the shaft (6) between said circumferential ring groove (18) and the convex and rounded, or essentially part ball-shaped end portion (19), said guide ring (23) having a diameter essentially identical to the diameter of the end portion (10) of the shaft (6).

3. The hand mixer of claim 2, wherein said guide ring (23) has smooth outer walls.

4. The hand mixer of claim 3, wherein the axial length of said guide ring (23) is at least 0.2 mm.

5. The hand mixer of claim 1, wherein said convex and rounded, or essentially part ball-shaped end portion (19) is formed in a part-spherical shape.

6. The hand mixer of claim 1, wherein, in axial cross section, the circumferential ring groove (18) is shaped in a form of an essentially circular curve, having a radius of curvature located at a theoretical center (20') outside of the shaft (6).

7. The hand mixer of claim 6, wherein the convex and rounded, or essentially part ball-shaped end portion (19) is part-spherically shaped with a spherical radius which is less than the radius of curvature of the circumferential ring groove (18).

8. The hand mixer of claim 6, including an essentially cylindrical guide ring (23) formed on the end portion (10) of the shaft (6) between said circumferential ring groove (18) and the convex and rounded, or essentially part ball-shaped end portion (19), said guide ring (23) having a diameter essentially identical to the diameter of the end portion (10) of the shaft (6).

9. The hand mixer of claim 8, wherein said guide ring has smooth outer walls.

10. The hand mixer of claim 8, wherein the axial length of said guide ring (23) is at least 0.2 mm.

11. The hand mixer of claim 8, wherein the axial length of the convex and rounded, or essentially part ball-shaped end portion (19) is less than the axial length of said circumferential ring groove (18).

12. The hand mixer of claim 6, wherein the radius of curvature of the circumferential ring groove (18) is between about 75% to 150% of the diameter of the shaft (6).

13. The hand mixer of claim 1, wherein the axial length of the convex and rounded, or essentially part ball-shaped end portion (19) is less than the axial length of said circumferential ring groove (18).

14. The hand mixer of claim 1, wherein the surfaces defining said circumferential ring groove are smooth.

15. The hand mixer of claim 1, wherein a portion (15) of a wall defining said hub (13) is radially, resiliently deflectable to form said resilient means (14, 15).

16. The hand mixer of claim 1, wherein the depth of the circumferential ring groove (18), measured at its minimum diameter, is between about 4% to 8% of the diameter of the end portion (10) of the shaft (6).

* * * * *